United States Patent [19]

Pignatelli et al.

[11] Patent Number: 5,457,372
[45] Date of Patent: Oct. 10, 1995

[54] LOAD SENSING, SOFT-BRAKING METHOD AND APPARATUS USING THE SAME

[76] Inventors: Joseph Pignatelli, 45 Cliftwood Dr., Huntington, N.Y. 11743; James M. Murphy, 13 Maplewood Dr., Brewster, N.Y. 10509

[21] Appl. No.: 93,179

[22] Filed: Jul. 16, 1993

[51] Int. Cl.⁶ ........................................................ B66B 1/32
[52] U.S. Cl. ............................................. 318/760; 318/375
[58] Field of Search ................................... 187/108, 109, 187/112, 116, 119, 293–297; 318/759–762, 375–378, 107

[56] References Cited

U.S. PATENT DOCUMENTS

| | | | |
|---|---|---|---|
| 2,173,289 | 11/1939 | Staley | 187/29 |
| 3,908,156 | 9/1975 | Anzai et al. | 318/799 |
| 3,986,703 | 10/1976 | Brett et al. | 254/362 |
| 4,278,150 | 7/1981 | Wehrli, III et al. | 187/116 |
| 4,319,665 | 3/1982 | Komura et al. | 187/119 |
| 4,380,049 | 4/1983 | Mähinen | 187/113 X |
| 4,491,197 | 1/1985 | Nishiwaki | 318/762 X |
| 4,857,818 | 8/1989 | Hobbs | 318/762 |
| 5,155,305 | 10/1992 | Horbruegger et al. | 187/119 |
| 5,265,701 | 11/1993 | Ogasawara et al. | 187/38 |

*Primary Examiner*—William M. Shoop, Jr.
*Assistant Examiner*—Brian Sircus
*Attorney, Agent, or Firm*—John F. Vodopia

[57] ABSTRACT

A device for precisely stopping an induction motor includes a current transformer for sampling a power level of an alternating current power source driving the motor during run time and an AC-DC converter/sample-and-hold circuit for generating a sampling voltage signal according to the sampling. Also included is circuitry responsive to the sampling voltage signal for determining an amount of direct current necessary to induce a static magnetic field to produce a torque within a stator winding of the motor sufficient to precisely stop the motor. A silicon controlled rectifier generates the determined amount of direct current and control circuitry causes the generated current to be injected into the stator winding. The induced static magnetic field static magnetic field is sufficient to precisely stop the motor regardless of the size of the load the motor is driving because it follows the sampling voltage signal.

17 Claims, 5 Drawing Sheets

LOAD SENSING, SOFT-BRAKING METHOD AND APPARATUS USING THE SAME

BACKGROUND OF THE INVENTION

1. Field of the Invention

This invention relates to braking control of induction motors, and more specifically relates to a method for implementing frictionless braking control of induction motors which relys on motor load sensing information and apparatus using the same.

2. Description of the Prior Art

Electronic braking of induction motors, i.e., frictionless braking, is well known. Electronic brakes of the prior art, such as the FASTSTOP™, manufactured by Electroid Co. of Springfield, N.J., and the SHORT*STOP™, manufactured by Ambitech Industries, Inc., of Westwood, N.J., utilize a method based on the injection of a controlled amount of direct current into stator windings of an alternating current (AC) driven induction motor to achieve braking after the AC has been removed.

Injecting direct current into a motor's stator windings after removing AC power induces a static magnetic field within the motor. The static field acts counter to the field generated within the motor as the rotor continues to spin after power is removed, i.e., a counter torque. The counter torque thereby stops motor rotation without mechanical braking means providing an essentially frictionless braking mechanism. However, such prior art electronic braking is imprecise and cannot be used in many braking control applications.

FIG. 1 depicts a conventional electronic braking circuit, softbrake circuit 2, the operation of which is based on the injection of direct current. An induction motor 4 is shown in the figure electrically connected through a first electrical node 6 to a motor control section 8. Motor control section 8 is electrically connected to an AC source 12 through a second electrical node 10.

The softbrake circuit 2 includes a contact switch 14 which is electrically connected to AC source 12 and motor control section 8 through electrical node 10. Contact switch 14 also electrically connects node 10 to a DC power and control section 16. DC power and control section 16 is also electrically connected to both a contact switch 18 and a logic and timing section 20. Contact switch 18 electrically connects DC power and control section 16 to both the motor 4 and the motor control section 8 through electrical node 6.

Logic and timing section 20 is shown in the figure electrically connected to a power sensing and switching section 22. Power sensing and switching section 22 is electrically connected through a third contact switch 24 to the motor control section 8. Power sensing and switching section 22 also provides an activation signal to the logic and timing section 20.

The softbrake circuit 2 operates in conjunction with motor 4 such that when motor 4 is powered, alternating current is delivered to the motor 4 through motor control section 8. Power sensing and switching section 22 senses the current flowing to the motor 4 through contact switch 24. When the driving current is removed, power sensing and switching section 22 generates an activation signal to activate the braking mechanism of softbrake circuit 2.

Logic and timer section 20 receives the activation signal from power sensing and switching section 22. Logic and timing circuits (not shown) within logic and timing section 20 respond to the activation signal by generating a DC control signal to DC power and control section 16. DC power and control section 16 responds by generating and supplying direct current to the motor 4 via contact switch 18 and electrical node 6.

The direct current generated by DC power and control section 16 is provided to the stator winding (not shown) of motor 4, inducing a static magnetic field therein. A rotor (not shown) within motor 4 rotating pursuant to existing motor inertia or torque generates a magnetic field which is acted upon by the induced static magnetic field. The static magnetic field attempts to align the field created by the rotating rotor thereby stopping rotation of the motor. The rotational or braking torque provided by softbrake circuit 2 is proportional to the field strength of the static magnetic field. The strength of the static magnetic field is directly proportional to the direct current injected into the stator windings of motor 4.

The above-described electronic braking mechanism provides no control mechanism for operating under varying motor inertial loads. Induction motors which operate with different torque requirements, i.e., varying motor inertial loads, require a more refined electronic braking control mechanism than is available in the prior art. For example, a single speed elevator motor operates with varied torque requirements in accordance with varying elevator car loads.

Single speed elevators typically utilize a very basic and inexpensive elevator control system to control the movement of elevator cars. The simplicity of single speed elevators and their controls make them extremely popular in buildings of eight floors or less. However, floor leveling problems are endemic within single speed elevator control systems. For example, stopping at a floor on either the ascent or descent is accomplished by merely removing power and applying mechanical braking at a fixed position above or below a floor. The elevator car subsequently glides to an uncontrolled stop. Such a system is inexact, rendering off-level and abrupt stops commonplace with varying elevator loads. Concomitantly, frequent user complaints as well as high maintenance cost are very common with such operation.

FIG. 2 shows a conventional single speed elevator control system. A hoist motor 26 is shown electrically connected to an AC power source 27 and an elevator control circuit 28. The hoist motor 26 is also mechanically connected to an elevator car 30 by a cable 29 extending over a rotatable pulley 31 and to a mechanical brake 25. An elevator car 30 is shown in FIG. 2 at a floor 32. A call station 34 and elevator car sensing means 36 are positioned at floor 32.

Call station 34 is electrically connected to a signal controller 39 and generates a signal transferred thereto indicating to which floor the elevator car must be sent. Signal controller 39 is electrically connected to elevator control circuit 28. Elevator car sensing means 36 is electrically connected directly to a relay controller 38. The relay controller is electrically connected the elevator control circuit 28 and generates and transmit relay control information thereto.

Operation of the conventional single speed elevator control system will now be explained.

A hall call signal may be transmitted by a user from call station 34 to summon elevator car 30. The hall call signal is received at signal controller 39. Signal controller 39 generates a control signal in response to the hall call signal and transfers the signal to relay controller 38. Relay controller 38 relays the control signal to elevator control circuit 28. Elevator control circuit 28 then generates the appropriate motor control signals to direct elevator car 30 to floor 32.

Hoist motor 26 is energized by AC power source 27 in response to the signal from relay controller 38. A number of buffer resistors (not shown) define the acceleration of the elevator car 30 when the hoist motor is powered. Varying the resistances of the buffer resistors varies the acceleration and, concomitantly, the smoothness of the elevator car start. The total resistance is defined manually by an elevator maintenance person, whose cost in labor adds to the elevator maintenance cost.

As elevator car 30 approaches the determined floor 32, a signal is generated at elevator car sensing means 36 indicating that the car 30 is within seven inches from the set stop position 32. Relay controller 38 responds to the generated car sensing signal by generating and relaying a signal to elevator control circuit 28. Elevator control circuit 28 causes the line voltage (driving power) to be removed from the hoist motor 26 in response thereto. Removal of power to the motor 26 also activates mechanical brake 25. Hoist motor 26 shuts down and the mechanical brake 25 mechanically stops the movement of elevator car 30. The stopping of elevator car 30 relies solely on the mechanical brake 25. The resulting stopped position of the car may be above or below the set stop position at floor 32, depending on a number of factors.

Several factors influencing the stopping accuracy of an elevator car stopped by mechanical means include the size of the load, i.e., the weight carried by the car, brake wear, brake tension and brake temperature. Conventional electronic braking mechanisms, i.e., frictionless braking, such as the braking circuit described above with response to FIG. 1, would probably improve the stopping accuracy for an elevator; however, known electronic braking system cannot provide precise control for exact stopping under various load conditions. Precise stopping of elevators is not only a requirement critical in minimizing maintenance costs, but also at times a requirement of local law.

OBJECTS AND SUMMARY OF THE INVENTION

It is therefore an object of the present invention to provide an electronic motor control method and apparatus capable of providing precise frictionless braking control for an induction motor irrespective of varying motor load.

It is another object of the present invention to provide an electronic motor control method and apparatus capable of providing precise frictionless braking control for an induction motor driving an elevator car irrespective of varying elevator car load.

It is yet another object of the present invention to provide an electronic motor control method and apparatus capable of braking an induction motor driving an elevator car without the need for mechanical braking means.

It is a further object of the present invention to provide an electronic motor control method and apparatus capable of providing precise control for an electric motor driving an elevator car, which method and apparatus are easily adaptable to an existing elevator control system employing mechanical elevator braking means.

In accordance with these and other objects of the present invention, a method for generating a braking torque sufficient to precisely stop an induction motor driven by an AC power source includes the steps of sampling a power level of the AC source and determining from the sampling an amount of direct current necessary to generate the braking torque. The method further includes the steps of generating the determined amount of direct current and injecting it into a stator winding of the induction motor after the (AC) source is removed.

The method may also include the step of storing a sampling voltage signal corresponding to the sampled AC power level and retrieving the stored sampling voltage signal for use in generating the determined amount of direct current. The injection of the direct current may be carried out over a predetermined time period in which the magnitude of the injected current varies substantially linearly from a minimum to a maximum determined stopping amount.

In another embodiment of the present invention, an apparatus for generating a braking torque sufficient to precisely stop an induction motor having a stator winding and driven by an AC power source includes sampling means electrically coupled to the AC power source to sample a power level of the AC source and generate a corresponding sampling signal. Determining means responsive to the sampling signal generate a current control signal proportional to an amount of direct current required to generate the braking torque. Also included are generating means responsive to the current control signal for generating the direct current from the AC power source and injecting means electrically connected to the generating means and the induction motor for injecting the generated direct current into the stator winding, thereby inducing a static magnetic field of sufficient magnitude to provide the braking torque.

The injecting means may inject the direct current over a predetermined time period in an amount varying substantially linearly from a minimum to a maximum determined stopping amount. The apparatus may also include storing means responsive to the sampling signal for generating a stored sampling signal and retrieving means electrically connected to the storing means for retrieving the stored sampling signal and transferring the stored sampling signal to the determining means.

A method for precisely stopping an induction hoist motor driving an elevator car includes the steps of sampling a power level of an AC power source supplying the hoist motor and generating a sampling signal therefrom. The method also includes the steps of determining from the sampling signal an amount of direct current required to generate a braking torque sufficient to precisely stop the hoist motor and elevator car, generating the determined amount of direct current and injecting the generated current into a stator winding of the motor after the AC power source is removed so that a static magnetic field is induced in the stator winding. The induced static magnetic field creates a counter torque within the motor sufficient to precisely stop the hoist motor and elevator car.

In still yet another embodiment of the present invention, a soft-braking apparatus is described for generating a braking torque sufficient to precisely stop an induction hoist motor driving an elevator car, the motor having a stator winding. The apparatus includes sampling means electrically coupled to an AC power source supplying power to the hoist motor for sampling an AC power level. The sampling means generates a sampling signal in accordance with the power level and determining means, responsive to the sampling signal, generate a current control signal proportional to the amount of direct current required to generate the braking torque. Generating means responsive to the current control signal generate the determined amount of direct current, and injecting means inject the generated current into the stator winding of the motor thereby inducing a static magnetic field sufficient to stop the motor.

Storing means may be included that are responsive to the sampling signal for generating a stored sampling signal and retrieving means for retrieving the stored sampling signal and transferring the same to the determining means.

These and other objects, features and advantages of this invention will become apparent from the following detailed description of illustrated embodiments thereof, which are to be read in conjunction with the accompanying drawings.

DETAILED DESCRIPTION OF THE PREFERRED EMBODIMENTS

Figure 1:
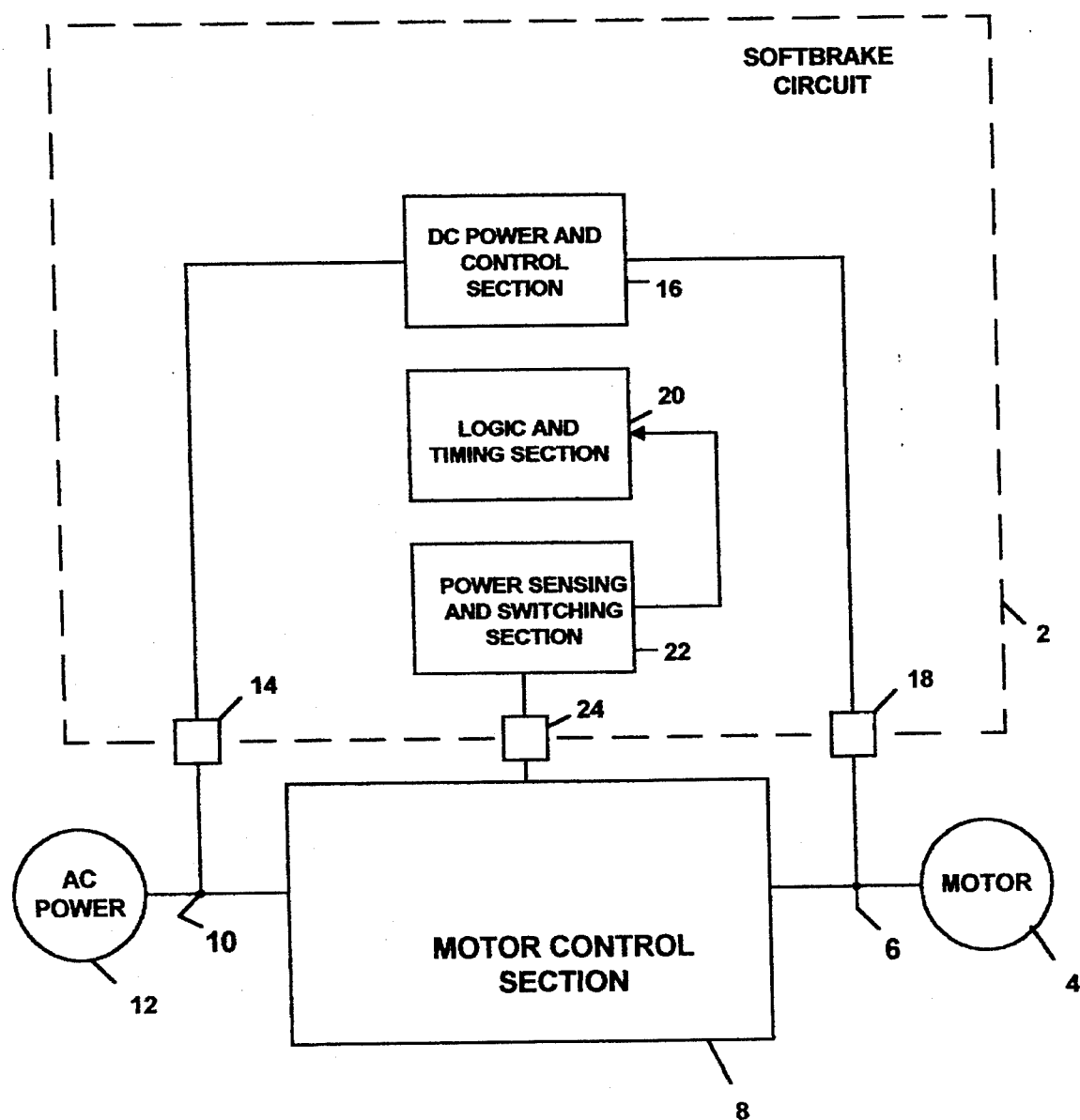
FIG. 1 is a block diagram of a direct current injection based electronic braking system of the prior art.
Figure 2:
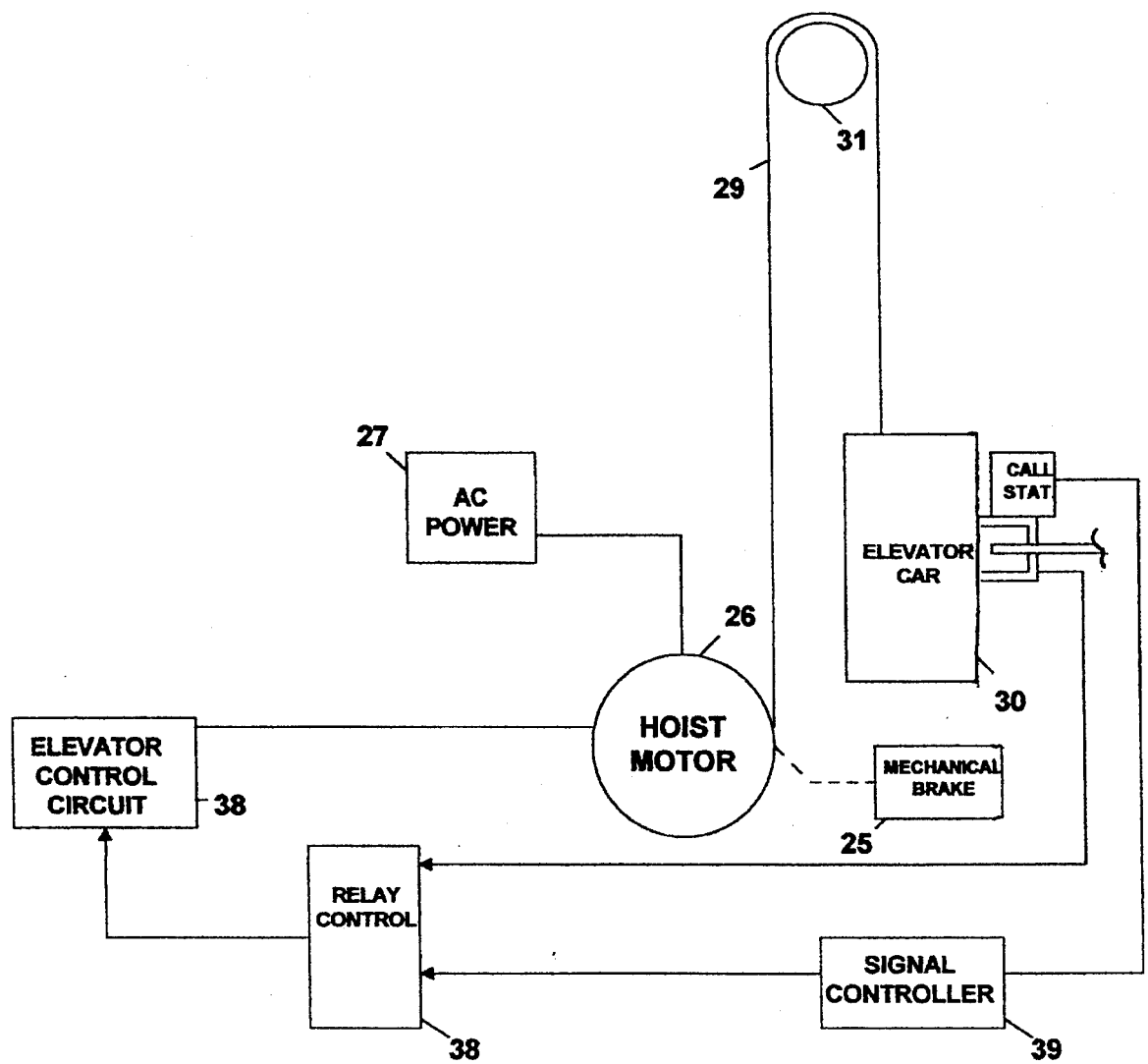
FIG. 2 is a block diagram showing key elements of a conventional single speed elevator control system.
Figure 3:
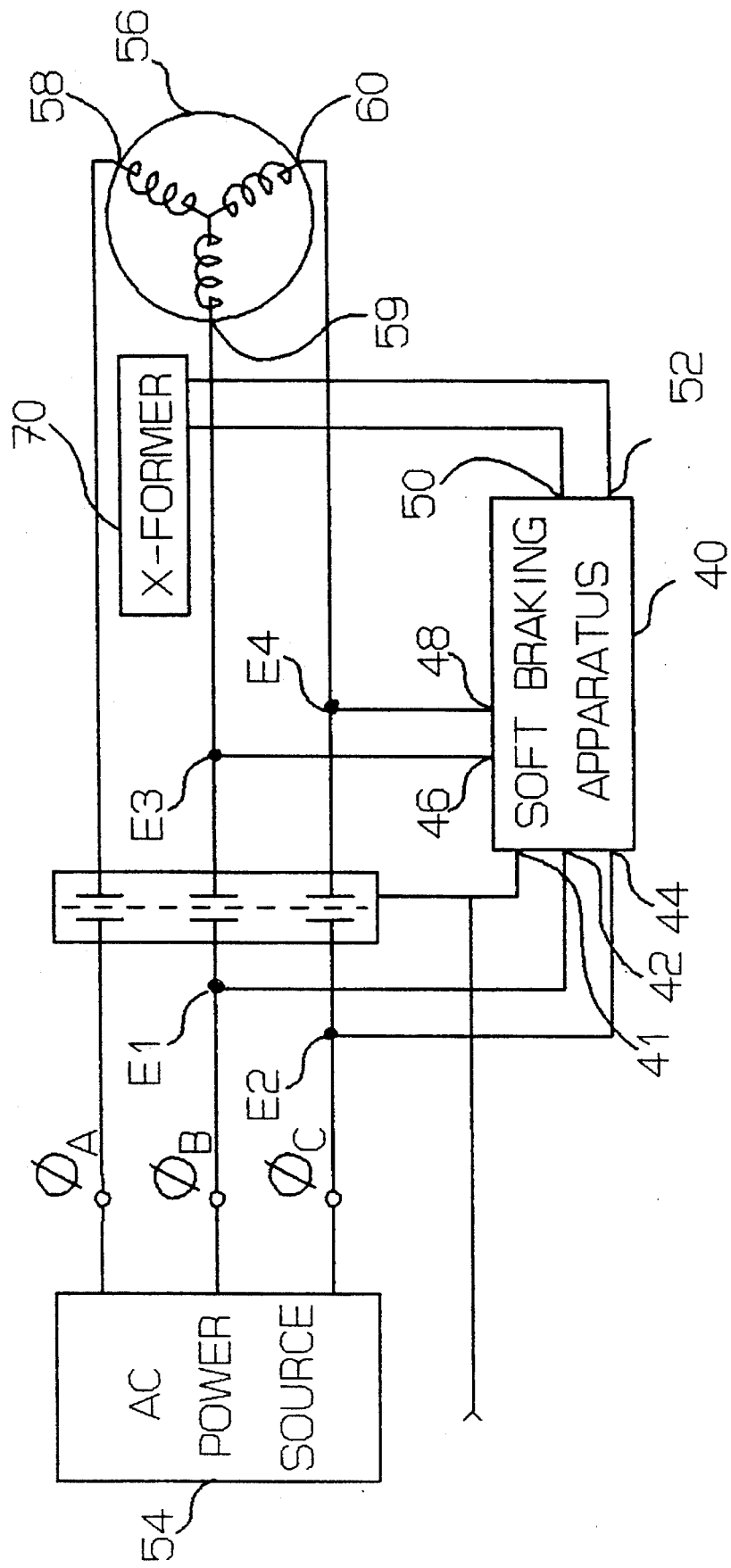
FIG. 3 is a block diagram of a soft-braking apparatus formed in accordance with the present invention and operating in conjunction with a three phase induction motor.

FIG. 3 depicts a load sensing, soft-braking apparatus 40 of the present invention, electrically connected between an alternating current (AC) power source 54 and a three-phase induction motor 56.

Three phases, $\phi_A$, $\phi_B$ and $\phi_C$, of AC power source 54 are shown electrically connected to first ends of motor contactors 64, 66, 68 of an electrical relay 62, respectively. Electrical nodes E1, E2 electrically connect phases $\phi_B$ and $\phi_C$ of power source 54 and first ends of contactors 66, 68 to AC power input ports 42, 44 of soft-braking apparatus 40, respectively. Second ends of contactors 64, 66, 68 are electrically connected to stator windings 58, 59, 60, respectively, of three-phase induction motor 58. The open or closed state of the contactors control whether power is supplied to each phase of the motor. Power is delivered when the contactors are closed and power is cut-off from the motor when the contactors are opened.

Electrical nodes E3, E4 electrically connect second ends of contactors 66, 68 and stator windings 59, 60 to direct current power output ports 46, 48 of soft-braking apparatus 40, respectively. Accordingly, direct current may be generated within soft-braking apparatus 40 and injected into the motor 56. A current transformer 70 is positioned proximate to a conductor 71 carrying phase $\phi_A$ of power source 54 and extending between the second end of contactor 64 and stator winding 58. The current transformer 70 is electrically connected at AC current sensing input ports 50, 52 of soft-braking apparatus 40 for sensing the AC current flowing to stator winding 58 through conductor 71 while motor 56 is powered.

Operation of the load sensing, soft-braking apparatus 40 is as follows. During run time, motor contactors 64, 66, and 68 are closed, providing an electrical path for each phase of power source 54 to each stator winding 58, 59 and 60, respectively, of motor 56. Current transformer 70 senses the alternating current flowing to stator winding 58 and generates a current sensing signal therefrom. The magnitude of the current sensing signal is proportional to the mechanical load (not shown) that the motor 56 is driving, i.e., the motor driving torque.

Soft-braking apparatus 40 receives the current sensing signal generated within current transformer 70. In order to stop the motor 56, a "stopping" signal is generated within a motor control circuit (not shown) and passed to both electrical relay 62 and soft-braking apparatus 40 through port 41. In response to the "stopping" signal, contactors 64, 66, 68 are opened and direct current is generated by the soft-braking apparatus proportional to the current sensing signal. The generated direct current is injected from ports 46, 48 of soft-braking apparatus 40 through stator windings 60 and 59. The direct current within the motor induces a static magnetic field proportional to the magnitude of the current sensing signal.

The induced static magnetic field acts on the magnetic field generated by a rotor (not shown) rotating within the motor 56. The induced field essentially creates a counter torque to the existing rotational torque. The counter torque cancels the existing rotational torque, over time, bringing the motor 56 to a controlled stop.

The magnitude of the induced counter torque applied to the motor is proportional to the magnitude of the injected direct current, which determines the time period for rotor rotation to cease. The direct current may be injected into the stator windings over a predetermined time period in the form of a ramped current signal. In such a manner, the magnitude of injected current varies from a minimum, such as zero amperes, to a maximum determined stopping current in accordance with the current sensing signal generated within current transformer 70. In this way, the load sensing, soft-braking apparatus provides for a precisely controlled motor stop.

Figure 4:
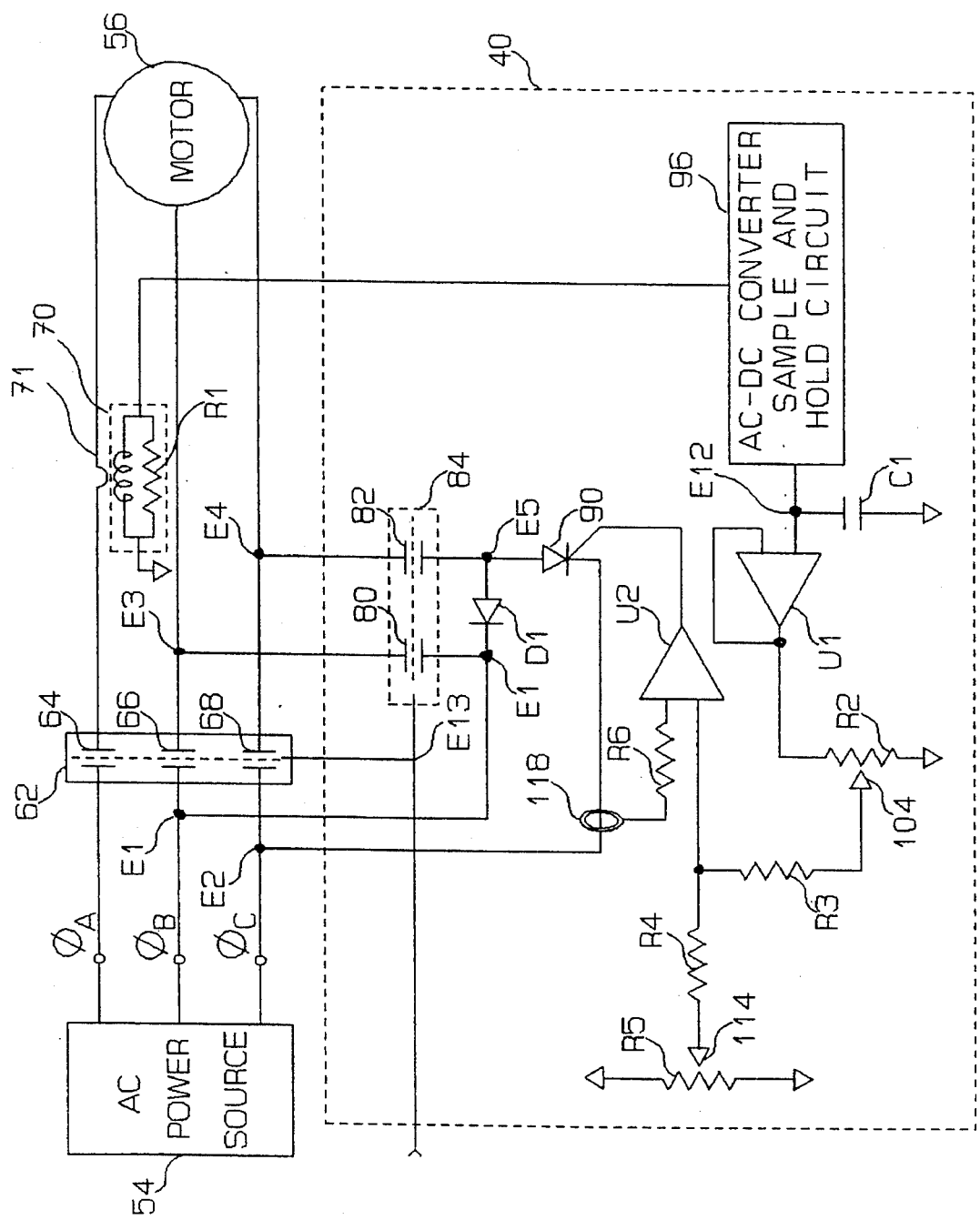
FIG. 4 is a schematic block diagram of the soft-braking apparatus of the present invention depicted in FIG. 3.

FIG. 4 illustrates a more detailed circuit of soft-braking apparatus 40 of the present invention, shown electrically connected to motor 56.

FIG. 4 shows phases $\phi_A$, $\phi_B$ and $\phi_C$ of an AC power source 54 electrically connected to first ends of electrical contactors 64, 66, 68, respectively, of a form X, three-pole electrical relay 62. The form X relay 62 is one of several commercially available relays which may be used with the present invention. As described above with reference to FIG. 3, second ends of electrical contactors 64, 66 and 68 electrically connect each phase of power source 54 to stator windings 58, 59, 60 (FIG. 3) of induction motor 56.

Electrical nodes E1, E2 electrically connect phases $\phi_B$ and $\phi_C$ of AC power source 54 and first ends of contactors 66, 68. Electrical nodes E2, E1 are also connected through a hall effect current sensor 118 to a cathode end of a silicon controlled rectifier (SCR) 90 and to a first end of a contactor 80 of a form X two-pole electrical relay 84, respectively. The form X, two-pole electrical relay 84 is also a relay that is suitable for use with the present invention. Electrical node E1 is also connected to a cathode end of a diode D1.

Anode end of diode D1 is electrically connected to an electrical node E5. Electrical node E5 electrically connects diode D1 to both a first end of contactor 82 and an anode end of SCR 90. Second ends of contactors 80 and 82 of relay 84 are electrically connected to electrical nodes E3 and E4, respectively. Electrical nodes E3, E4 also electrically connect second ends of contactors 66, 68 to the second and third phases of motor 56 at stator windings 59 and 60 (FIG. 3).

Load sensing, soft-braking apparatus 40 includes a current transformer 70 electrically coupled to electrical conductor 71. Conductor 71 carries phase $\phi_A$ between electrical contactor 64 and stator winding 58 of the motor 56. Current transformer 70 is electrically connected to an AC-DC converter/sample-and-hold (S-and-H) circuit 96. Transformer action induces an AC current signal within current transformer 70 proportional to the AC within line 71. The induced AC current signal produces a voltage across a resistor R1 that is passed into AC-DC converter/S-and-H circuit 96, generating an AC sensing signal therein.

The AC sensing signal output from AC-DC converter/S-and-H circuit 96 is coupled to an operational amplifier U1 and a capacitor C1. Capacitor C1 holds the voltage level of the AC sensing signal and operational amplifier U1 acts as a high impedance buffer between capacitor C1 and a load compensation potentiometer R2. The other end of capacitor C1 is connected to ground. Output from operational amplifier U1 is both fed back to the amplifier's inverting input and provided to load compensation potentiometer R2.

Load compensation potentiometer R2 scales the AC current sensing signal according to an adjustment made at installation, i.e., installation of the soft-braking apparatus 40 to an existing motor control system (not shown). Variable contact 104 of load compensation potentiometer R2 is electrically connected to an electrical node E6 through a resistor R3. Node E6 also connects a first end of a resistor R4 and a non-inverting input of a current-controlling operational amplifier U2. The scaled AC current sensing signal present at electrical node E6 controls the direct current to the motor 56 when the motor is to be stopped.

A second end of resistor R4 electrically connects a variable contact 114 of a torque setting potentiometer R5. Torque setting potentiometer R5 provides an offset signal to further adjust the AC current sensing signal at electrical node E6. Like the load compensation potentiometer R2, torque setting potentiometer R5 is adjusted at installation of the apparatus.

An inverting input of operational amplifier U2 is electrically connected to hall effect current sensor 118 through a resistor R6. The hall effect current sensor 118 senses the DC flowing through SCR 90 during stopping and generates a DC sensing signal in response thereto. The difference between the voltage level at node E6 and the induced DC sensing signal is amplified within current controlling operational amplifier U2. A DC control signal output from operational amplifier U2 is coupled to the gate of SCR 90 to control current flow through the SCR 90. The DC control signal allows a direct current to flow through the SCR proportional to the magnitude of the DC control signal.

Operation of the soft-braking apparatus 40 is as follows.

While contactors 64, 66 and 68 of electrical relay 62 are closed, phases $\phi_A$, $\phi_B$ and $\phi_C$ of power source 54 drive induction motor 56. Current transformer 70 senses the AC supplied to phase $\phi_A$ of the motor 56. In response to the sensed AC power within line 71, a proportional AC current signal is induced via transformer action. The AC current signal is seen as a proportional AC voltage signal across resistor R1. AC-DC converter/S-and-H circuit 96 generates the AC sensing signal therefrom, which is output and held on capacitor C1. The AC sensing signal passes through amplifier U1 and is scaled by load compensation potentiometer R2 and offset torque setting potentiometer R5. The scaled AC sensing signal is then input with the DC sensing signal generated within the hall effect sensor 118 to operational amplifier U2. Operational amplifier U2 generates therefrom the DC control signal for application at the gate of SCR 90.

When the motor is to be stopped, a "stopping" signal is generated within a motor control circuit (not shown in the figure) and fed into both relay 62 and relay 84. Contactors 64, 66 and 68 of relay 62 are opened in response thereto, and contactors 80, 82 of relay 84 are closed approximately 100 milliseconds later. The result is that AC power is prevented from reaching motor 56 and a direct current path from apparatus 40 to the motor is formed. The DC control signal provided to the gate of SCR 90 determines the magnitude of current to be rectified and injected into the motor as direct current.

The DC sensing signal generated within hall effect current sensor 118 is proportional to the direct current flowing from phase $\phi_C$ of the AC power source 54 through SCR 90. The DC sensing signal is fed to the inverting input of operational amplifier U2. The difference between the DC sensing signal and the AC sensing signal, present at the inverting and non-inverting input of amplifier U2, is reflected in the DC control signal output therefrom. The resulting DC control signal is applied to the gate of SCR 90.

Direct current flows through SCR 90 into the motor 56. The magnitude of DC sensing signal builds at the inverting input of operational amplifier U2 as the current flows. The voltage at the gate of SCR 90 ramps up until the difference between signals at the amplifier input becomes zero. Consequently, the current flowing into the stator windings of motor 56 stops increasing such that a constant flow of current into the motor is formed. The maximum current flows into the windings until contacts 80, 82 are again closed ceasing the flow of current through SCR 90.

The direct current flowing in accordance with the DC control signal induces the static magnetic field described above within the stator windings of the motor 56. The static magnetic field acts to counter the field generated by rotation of the motor's rotor (not shown). The induced static field acts essentially as a torque counter to existing motor torque, bringing the motor 56 to a controlled stop. By controlling the magnitude of the direct current applied to the motor over time, the stopping torque is controlled.

Figure 5:
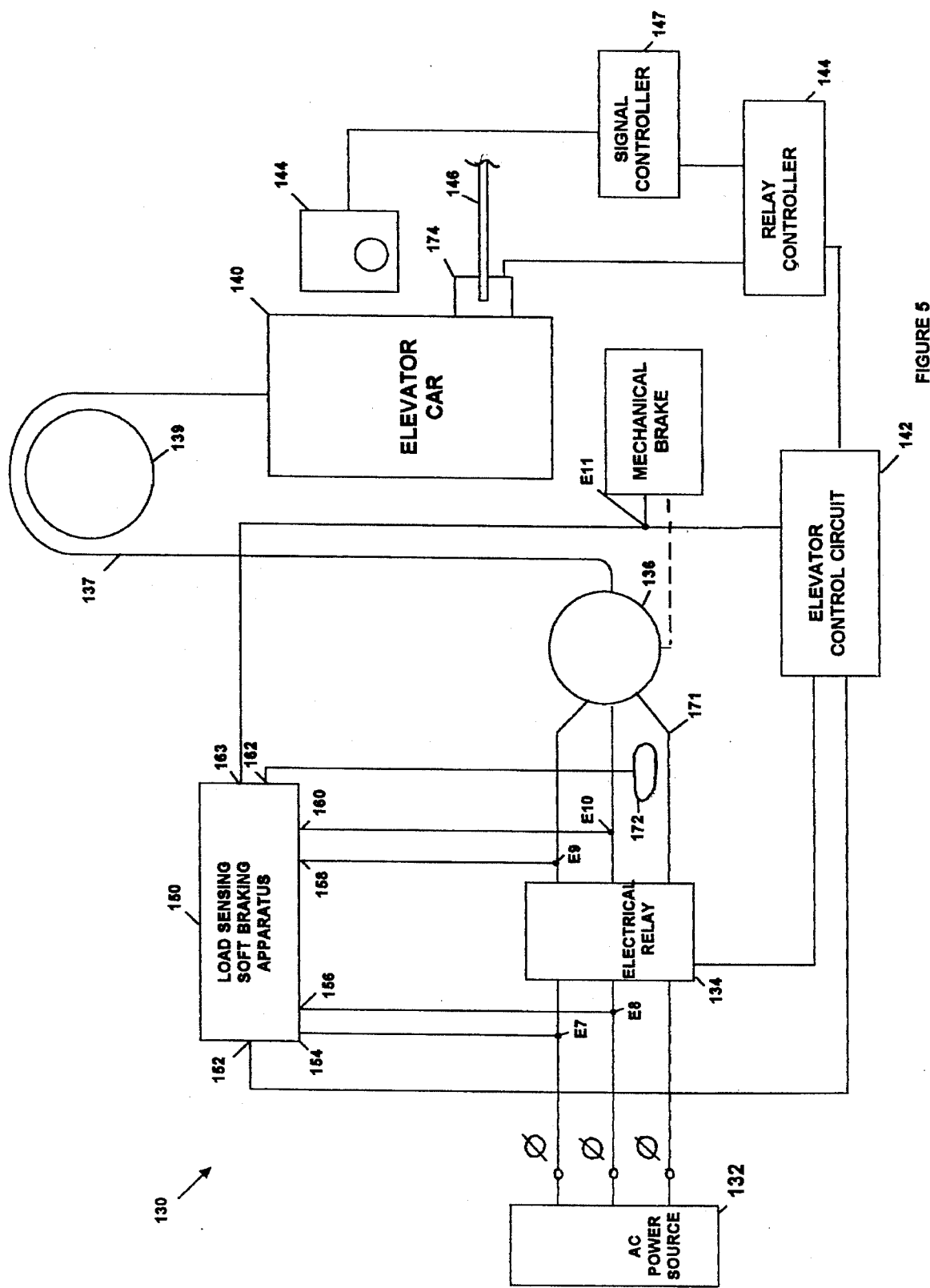
FIG. 5 is a block diagram of a soft-braking apparatus formed in accordance with the invention and integrated within an elevator control system.

FIG. 5 shows a load sensing, soft-braking apparatus 150 formed in accordance with the present invention as part of an elevator control system 130.

An AC power source 132 for providing AC power to elevator hoist motor 136 is shown in FIG. 5 with each of its three phases $\phi_A$, $\phi_B$ and $\phi_C$ electrically connected to a first end of an electrical relay 134. Electrical relay 134 is electrically connected at its second end to the elevator hoist motor. Electrical relay 134 switches AC power into stator windings (not shown) of elevator hoist motor 136.

Electrical nodes E7, E8 electrically connect phases $\phi_C$, $\phi_B$ of AC power source 132 and the first end of two contactors within relay 134 to AC power input ports 154, 156 of soft-braking apparatus 150. Electrical nodes E9, E10 electrically connect a second end of electrical contactors within relay 134 and stator windings (not shown) of hoist motor 136 to DC power output ports 158, 160 of soft-braking apparatus 150.

Hoist motor 136 is mechanically connected to an elevator car 140 by a cable 137 extending over a rotateable pulley 139. Hoist motor 136 drives elevator car 140 in conjunction with elevator control circuit 142. Elevator control circuit 142 is electrically connected to relay 134 and to soft-braking apparatus 150 at ports 152 and 163. Elevator control circuit 142 generates and transmits control signals to port 152 of soft-braking apparatus 150 and relay 134. Port 163 of soft-braking apparatus 150 electrically couples braking control signals generated therein into both a mechanical brake 165 and elevator control circuit 142.

A call station 144 is shown in the FIG. 5 positioned at an elevator floor stop 146. Call station 144 is electrically connected to a signal controller 147. Call signals generated within call station 144 are passed to signal controller 147 to inform the signal controller of the request to move the elevator car 140 to floor stop 146. Elevator car sensing means 174 is electrically connected to a relay controller 144. Elevator car sensing means 174 generates a signal informing relay controller 144 that elevator car 140 is within a predetermined distance from the sensing means 174. Relay controller 144 electrically connects signal controller 147 and elevator car sensing means 174 to elevator control circuit 142.

A current transformer 172 is positioned proximate to a conductor 171 carrying phase $\phi_A$ between a second end of a contactor within relay 134 and a third stator winding (not shown) of hoist motor 136. Current transformer 172 senses the AC supplied as phase $\phi_A$ to hoist motor 136 while the motor is driven by AC power source 132. The hoist motor 136 is driven to raise and lower elevator car 140 in accordance with elevator control information signals provided by elevator control circuit 142.

Operation of load sensing, soft-braking apparatus 150 of the present invention in conjunction with elevator control system 142 is as follows.

A passenger at floor 146 places a hall call at call station 144 in order to summon an elevator car to the floor. A call signal is generated within call station 144 and transmitted to signal controller 147. Signal controller 147 receives the call signal and transmits a control signal in response thereto to relay controller 144. Relay controller 144 relays the control signal to elevator control circuit 142. Elevator control circuit 142 responds, by, among other things, generating control signals to close the contactors within electrical relay 134, deactivate mechanical brake 165 (holding the elevator stationary) and power the hoist motor 136.

Hoist motor 136 responds by moving elevator car 140 towards floor 146. While the hoist motor 136 is driven, current transformer 172 senses the AC driving phase $\phi_A$ of the motor, and generates a sampling signal proportional to the power level of the AC sensed. Soft-braking apparatus 150 receives the sampling signal from current transformer 142. Soft-braking apparatus 150 may store the sampling signal as a stored sampling signal for later use in stopping hoist motor 136.

When elevator car 140 is within stopping distance of floor 146, floor sensor 174 generates a stopping signal indicating the same and transmits the generated stopping signal to relay controller 144. Relay controller 144 responds to the stopping signal by generating a relay stop signal to alert elevator control circuit 142 of the need to cut off AC power to the hoist motor 136.

Elevator control circuit 142 generates at least two signals in response to the relay stop signal. A first signal generated is for opening the electrical contactors of relay 134, thereby removing AC power from the motor. The second signal generated is to signal soft-braking apparatus 150 that hoist motor 136 must be stopped. The elevator control circuit 142 transmits the signals to relay 134 and soft-braking apparatus 150, respectively.

Relay 134 is opened in response to the first signal from control system 142, thereby cutting off the AC power to the hoist motor 136. Concomitantly, control circuit 142 generates and transmits an injection control signal to electrical contactors (FIG. 4) within soft-braking apparatus 150 in response to the second signal. The contactors close in response to the injection control signal, causing alternating current from AC power source 132 to flow through nodes E7, E8 into the soft-braking apparatus 150. The alternating current is rectified therein to a direct current. The direct current is then injected through nodes E9, E10 into the motor's stator windings.

The injected direct current induces a static magnetic field within the motor's stator windings. Because the direct current is proportional to the sampling voltage signal, the direct current is proportional to the AC driving the motor just prior to stopping. Because the AC driving the motor is proportional to the mechanical motor load, i.e., the elevator load, the injected direct current is proportional to the elevator load. The direct current induced magnetic field is proportional to the injected direct current and generates a torque counter to the existing torque generated by the motor's rotating rotor. The counter torque acts against the existing motor torque thereby stopping the motor. The stopping time period is dependent on the magnitude of the injected current and of the existing motor torque.

Calls requesting elevator operation may be generated within elevator car 140 as well as from various call stations tied to the elevator control system.

As can be seen from the above description, the load sensing, soft-braking apparatus 150 of the present invention is capable of providing a controlled stop for an induction motor driven by an AC power source. In particular, the load sensing, soft-braking apparatus 150 may be operated in conjunction with an elevator control system whereby elevator cars can be precisely stopped regardless of the elevator car load.

Although illustrative embodiments of the present invention have been described herein with reference to the accompanying drawings, is to be understood that the invention is not limited to those precise embodiments, and that various other changes and modifications may be effected therein by one skilled in the art without departing from the scope or spirit of the invention.

What is claimed is:

1. A method for generating a braking torque sufficient to precisely stop an induction motor having a stator winding, the induction motor being driven by an alternating current (AC) power source, comprising the steps of:

determining an amount of direct current required to generate the braking torque while the motor is being driven by the AC power source;

generating the determined amount of direct current; and injecting the generated direct current into the stator winding after the AC power source is removed thereby inducing a static magnetic field of sufficient magnitude to provide the braking torque.

2. A method as defined by claim 1 wherein the generated direct current is injected over a predetermined time period in an amount varying substantially linearly from a minimum to a maximum determined amount.

3. A method as defined by claim 1 including the step of sampling a power level supplied by the AC source driving the induction motor and generating a sampling signal therefrom, and wherein the step of determining is performed in accordance with the sampling signal.

4. A method as defined by claim 3, further comprising the steps of:

storing the sampling signal corresponding to the power level sampling and thereby generating a stored sampling signal; and retrieving the stored sampling signal for use in generating the determined amount of direct current.

5. Apparatus for generating a braking torque sufficient to precisely stop an induction motor having a stator winding, the induction motor driven by an alternating current (AC) power source, comprising:

determining means for determining an amount of direct current required to generate the braking torque and generating a current control signal proportional thereto while the motor is being driven by the AC power source;

generating means responsive to the current control signal for generating from the AC power source the determined amount of direct current; and injecting means electrically connected to the generating means and the induction motor for injecting the generated direct current into the stator winding after the AC power source is removed thereby inducing a static magnetic field of sufficient magnitude in the motor to provide said braking torque.

6. An apparatus as defined by claim 5 further comprising sampling means electrically coupled to the AC power source to sample a power level supplied by the source and generate a sampling signal therefrom, and wherein the determining means generate the current control signal in response to said sampling signal.

7. An apparatus as defined by claim 5, wherein the injecting means injects the generated current over a predetermined time period in an amount varying substantially linearly from a minimum to a maximum determined stopping amount.

8. An apparatus as defined by claim 6, further comprising:

storing means responsive to the sampling signal for generating and storing a stored sampling signal; and retrieving means electrically connected to the storing means for retrieving the stored sampling signal and transferring the same to the determining means as a sampling signal.

9. A method for precisely stopping an induction hoist motor driving an elevator car and powered by an alternating current (AC) power source, the induction motor having a stator winding, comprising the steps of:

determining an amount of direct current required to generate a braking torque sufficient to precisely stop the induction hoist motor and the elevator car while the motor is being driven by the AC power source;

generating the determined amount of direct current; and injecting the generated direct current into the stator winding after the AC power source is removed.

10. A method as defined by claim 9, wherein the generated current is injected over a predetermined time period in an amount varying substantially linearly from a minimum to a maximum determined stopping amount.

11. A method as defined by claim 9, including the step of sampling a power level supplied by the AC power source and generating a sampling signal therefrom, and wherein the step of determining is performed in accordance with the sampling signal.

12. A method as defined by claim 11, wherein the step of injecting direct current includes injecting the direct current over a predetermined stopping time period in an amount varying substantially linearly from a minimum to a maximum determined stopping amount.

13. A method as defined by claim 11, further comprising the steps of:

storing a sampling signal corresponding to the sampled power level and thereby generating a stored sampling signal; and retrieving the stored sampling signal for use in generating the determined amount of direct current.

14. A soft-braking apparatus for precisely stopping an induction hoist motor driving an elevator car and powered by an alternating current (AC) power source, the induction hoist motor having a stator winding, comprising;

determining means for determining an amount of direct current required to generate a braking torque sufficient to precisely stop the hoist motor and elevator car while the motor is being driven by the AC power source and generating a current control signal in accordance thereto;

generating means responsive to the current control signal for generating the direct current; and injecting means for injecting the generated current into the stator winding to induce a static magnetic field within the hoist motor thereby providing a braking torque of sufficient magnitude to precisely stop the hoist motor and elevator car after the AC power source is removed.

15. A soft-braking apparatus as defined by claim 14, further comprising sampling means electrically connected to the AC power source driving the hoist motor for sampling a power level supplied by the AC power source and generating a sampling signal therefrom, and wherein the determining means generates the current control signal in response to the sampling signal.

16. An apparatus as defined by claim 14, wherein the injecting means injects the generated current over a predetermined time period in amount varying substantially linearly from a minimum to a maximum determined stopping amount.

17. An apparatus as defined by claim 15, further comprising:

storing means responsive to the sampling signal for generating and storing a stored sampling signal; and retrieving means electrically connected to the storing means for retrieving the stored sampling signal and transferring the stored sampling signal to the determining means as a sampling signal.

* * * * *